United States Patent
Hakoda et al.

(10) Patent No.: US 7,132,068 B2
(45) Date of Patent: *Nov. 7, 2006

(54) MOLD CLOSURE POSITION DETECTION METHOD FOR MOLD CLAMPING APPARATUS

(75) Inventors: Takashi Hakoda, Nagano-ken (JP); Toshimi Kato, Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/092,631

(22) Filed: Mar. 30, 2005

(65) Prior Publication Data

US 2005/0218544 A1  Oct. 6, 2005

(30) Foreign Application Priority Data

Mar. 31, 2004  (JP)  ............................. 2004-107549

(51) Int. Cl.
*B29C 45/64* (2006.01)
*B29C 45/80* (2006.01)

(52) U.S. Cl. ................. 264/40.1; 264/40.5; 264/328.1; 425/138; 425/150; 425/589; 425/593

(58) Field of Classification Search ............... 264/40.1, 264/40.5, 328.1; 425/137, 138, 150, 589, 425/595, 593

See application file for complete search history.

(56) References Cited

U.S. PATENT DOCUMENTS

| 4,281,977 | A | * | 8/1981 | Farrell | ........................ | 425/149 |
| 5,059,365 | A | * | 10/1991 | Hertzer et al. | ............. | 264/40.5 |
| 6,157,158 | A | * | 12/2000 | Ishikawa | .................... | 264/40.5 |
| 6,419,861 | B1 | * | 7/2002 | Stirn et al. | .................. | 264/40.5 |
| 2004/0067276 | A1 | * | 4/2004 | Watanabe | .................... | 425/595 |

FOREIGN PATENT DOCUMENTS

JP   62-32020 A   2/1987
JP   6-61806 B2   8/1994

* cited by examiner

*Primary Examiner*—Jill L. Heitbrink
(74) *Attorney, Agent, or Firm*—Birch, Stewart Kolasch & Birch, LLP

(57) ABSTRACT

In a mold closure position detection method, a mold closure position is detected on the basis of a variation in a physical quantity because of closure of a mold. The method comprises detecting an amount of movement of a movable platen, or a crosshead in the case where the mold clamping apparatus is of a toggle type, during closure of the mold; detecting a variation in the physical quantity because of closure of the mold; obtaining a rate of variation (which encompasses an amount of variation) in the physical quantity to a predetermined amount of movement of the movable platen or the crosshead; and detecting, as a mold closure position, a position of the movable platen or the crosshead when the variation rate reaches a preset ratio.

8 Claims, 9 Drawing Sheets

MOLD CLOSURE POSITION DETECTION METHOD FOR MOLD CLAMPING APPARATUS

BACKGROUND OF THE INVENTION

1. Field of the Invention

The present invention relates to a mold closure position detection method for a mold clamping apparatus, which method detects a mold closure position on the basis of a variation in a physical quantity because of closure of a mold.

2. Description of the Related Art

A conventional toggle-type mold clamping apparatus for clamping a mold of an injection molding machine is disclosed in, for example, Japanese Patent Publication (kokoku) No. 6(1994)-61806. As disclosed in this publication, a toggle-type mold clamping apparatus includes a toggle link mechanism which connects a movable platen for supporting a movable mold half and a crosshead advanced and retracted by a drive unit, and has a function of transmitting pressing force of the crosshead to the movable platen while amplifying the force. In such a mold clamping apparatus, when the toggle link mechanism is almost completely extended, a predetermined mold clamping force determined on the basis of an extension of tie bars is generated. As shown in FIG. 10, in a mold clamping operation, high-speed mold closing is typically performed from a mold open position Xa, and the operation mode is switched to low-speed, low-pressure mold closing at a predetermined low-speed, low-pressure changeover position Xb. The period during which the low-speed, low-pressure mold closing is performed serves as a mold protection zone, during which a molded product not having been properly ejected or the like is detected as a foreign object. When a predetermined high-pressure changeover position Xc is reached, the operation mode is switched to high-pressure mold clamping so as to clamp the mold under high pressure. In FIG. 10, Xd shows a mold clamping end position. Load torque T of a drive motor for driving the mold clamping apparatus changes as shown in FIG. 10 during the mold clamping operation.

Incidentally, unlike a direct-pressure-application-type mold clamping apparatus, because of its operation principle, a toggle-type mold clamping apparatus has a drawback in that slight expansion or contraction of a mold and tie bars, stemming from disturbing factors such as heating temperature of the mold and ambient temperature, causes a considerable variation in mold clamping force, which results in deterioration in quality, in particular at the time of molding of precision products. FIG. 11 shows a variation in mold clamping force Fm with time for the case where the correct value (target value) of mold clamping force Fm is 400 kN. As is apparent from FIG. 11, during a period in which the mold temperature elevates, the mold clamping force Fm increases from 400 kN to 500 kN because of thermal expansion of the mold. After completion of the temperature elevation, since heat is transferred from the mold to the tie bars, the tie bars expand, whereby the mold clamping force Fm gradually decreases. Notably, thermal expansion of the mold is a factor which increases the mold clamping force Fm, and thermal expansion of the tie bars is a factor which decreases the mold clamping force Fm.

As described above, in a toggle-type mold clamping apparatus, disturbing factors such as heating temperature of a mold and ambient temperature are influential factors which must be taken into consideration so as to accurately maintain the mold clamping force Fm. Japanese Patent Application Laid-Open (kokai) No. 62(1987)-32020 discloses a mold clamping force control method for a toggle-type mold clamping apparatus, which method can cope with such disturbing factors. In the disclosed method, the thickness of a mold or a mold clamping force during a molding operation is detected by means of mold-thickness detection means consisting of an optical or magnetic scale supported on a stationary mold plate and a position detector disposed on a movable mold plate, and a correction value determined from the detected thickness and its target value is fed back to mold-thickness adjustment means, whereby mold clamping force is maintained constant.

However, the conventional mold clamping force control method (mold closure position detection method) for a toggle-type mold clamping apparatus has the following problems.

First, as described above, in a toggle-type mold clamping apparatus, slight expansion or contraction of a mold results in a considerable variation in mold clamping force. Since the conventional mold clamping force control method detects the thickness of a mold (mold clamping force) by use of mold-thickness detection means consisting of a scale supported on a stationary mold plate and a position detector disposed on a movable mold plate; i.e., the method detects slight expansion and contraction, the method cannot accurately detect mold clamping force (mold closure position).

Second, since the thickness of a mold is detected directly, separate mold-thickness detection means such as a scale and a position detector are needed, leading to an increase in the number of parts, higher cost, and increased degree of complexity of configuration; in particular, an increased degree of complexity of the structure around a mold.

SUMMARY OF THE INVENTION

An object of the present invention is to provide a mold closure position detection method for a mold clamping apparatus, which method can perform more accurate and consistent (stable) detection as compared with the case where a physical quantity (absolute value) itself is compared with a threshold; more specifically, a mold closure position detection method for a mold clamping apparatus, which method enables accurate and consistent detection without direct influence of disturbances such as temperature drift and mechanical friction, and which method greatly reduces resetting and fine adjustment which are necessary when mold closing speed or mold clamping force is changed upon replacement of a mold.

Another object of the present invention is to provide a mold closure position detection method for a mold clamping apparatus, which method eliminates the necessity for mold-thickness detection means, such as a scale and a position detector, for directly detecting the thickness of a mold at the time of detection of a mold closure position, to thereby lower cost through reduction in the number of parts, and prevent the structure around a mold from becoming complex.

Still another object of the present invention is to provide a mold closure position detection method for a mold clamping apparatus, which method enables accurate detection of a mold closure position while eliminating influences of mold closing speed and other factors, to thereby enable accurate detection of variation in mold closing force and accurate correction of mold clamping force.

To achieve the above object, the present invention provides a mold closure position detection method for a mold clamping apparatus in which a mold closure position is detected on the basis of a variation in a physical quantity because of closure of a mold, the method comprising: detecting an amount of movement of a movable platen, or a crosshead in the case where the mold clamping apparatus is of a toggle type, during closure of the mold; detecting a variation in the physical quantity because of closure of the mold; obtaining a rate of variation (which encompasses an amount of variation) in the physical quantity to a predetermined amount of movement of the movable platen or the crosshead; and detecting, as a mold closure position, a position of the movable platen or the crosshead when the variation rate reaches a preset ratio.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the structure of a toggle-type mold clamping apparatus Mc to which a mold closure position detection method according to the present embodiment can be applied will be described with reference to FIGS. 5 to 9.

Figure 5:
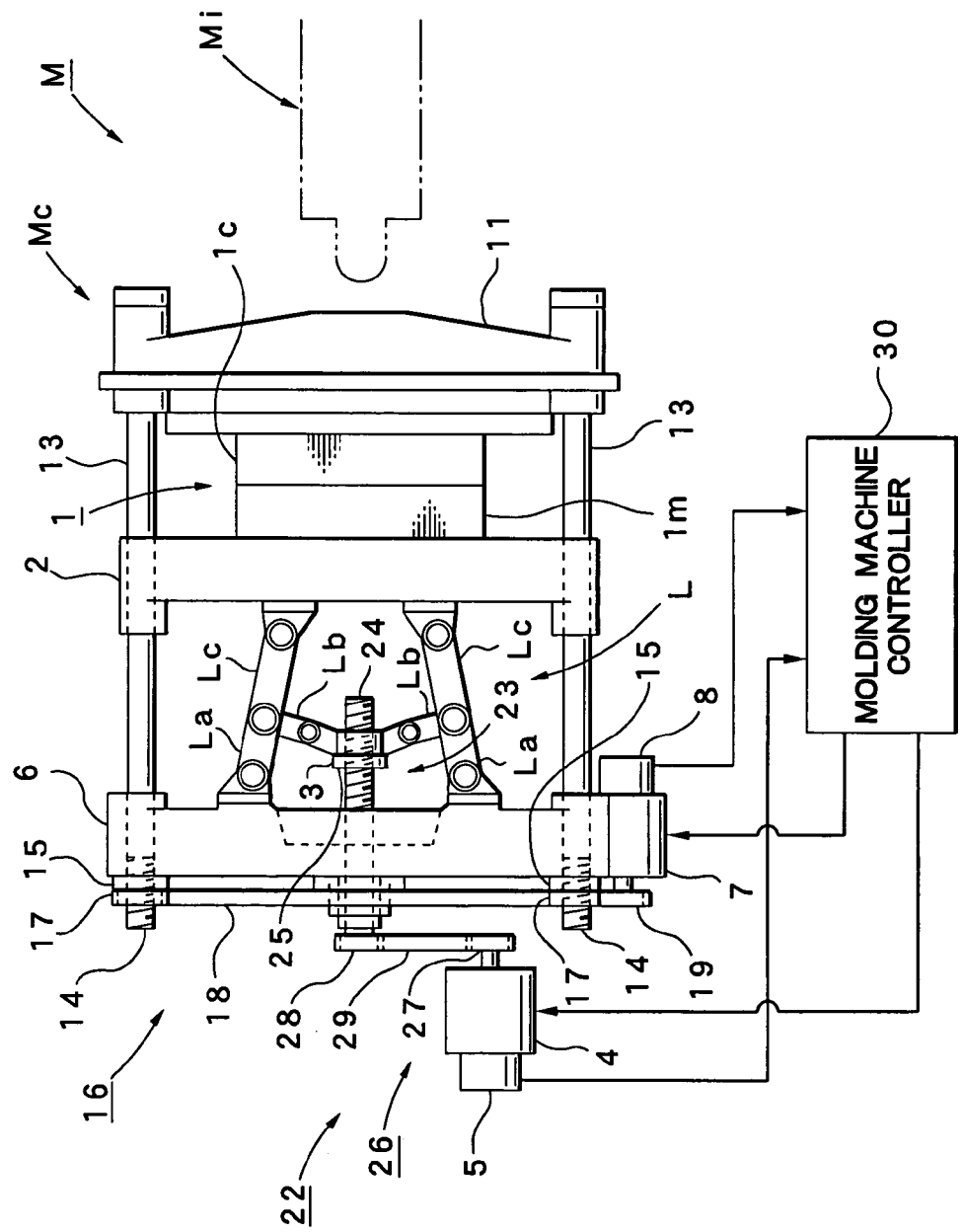
FIG. 5 is a view showing the structure of a toggle-type mold clamping apparatus for which the mold closure position detection method is performed.

FIG. 5 shows an injection molding machine M including a toggle-type mold clamping apparatus Mc and an injection apparatus Mi. The toggle-type mold clamping apparatus Mc includes a stationary platen and a pressure-receiving platen 12 which are separated from each other. The stationary platen is fixedly mounted oh an unillustrated machine base, and the pressure-receiving platen 12 is mounted on the machine base in such a manner that it can advance and retract. Four tie bars 13 extend between the stationary platen and the pressure-receiving platen 12. Front ends of the tie bars 13 are fixed to the stationary platen, and rear ends of the tie bars 13 pass through the pressure-receiving platen 12. Adjustment nuts 15, which also serve as stoppers for the pressure-receiving platen 12, are in screw-engagement with male threads 14 formed at the rear ends of the tie bars 13.

The adjustment nuts 15 constitute a mold-thickness adjustment mechanism 16 for adjusting the position of the pressure-receiving platen 12. This mold-thickness adjustment mechanism 16 further includes small gears 17 coaxially and integrally provided on the respective adjustment nuts 15; a large gear 18 in meshing engagement with the small gears 17; a drive gear 19 in meshing engagement with the large gear 18; a mold-thickness adjustment motor 20 having a rotary shaft on which the drive gear 19 is attached; and a rotary encoder 21 for detecting rotation of the mold-thickness adjustment motor 20.

In this case, the small gears 17 are disposed at corresponding corners of a square, and the large gear 18 is located to be surrounded by the small gears 17, so that all the small gears 17 are in meshing engagement with the large gear 8 at all times. Therefore, when the mold-thickness adjustment motor 20 is operated to rotate the drive gear 19, rotation of the drive gear 19 is transmitted to the large gear 18. Thus, the small gears 17 rotate simultaneously, and the adjustment nuts 15, which rotate together with the corresponding small gears 17, advance or retract along the male threads 14 of the tie bars 13. As a result, the pressure-receiving platen 12 advances or retracts, whereby the position of the pressure-receiving platen 12 in the forward/backward direction can be adjusted.

Meanwhile, a movable platen 2 is mounted slidably on the tie bars 13. The movable platen 2 supports a movable mold half 1m, and the stationary platen supports a stationary mold half 1c. The movable mold half 1m and the stationary mold half 1c constitute a mold 1. A toggle link mechanism L is disposed between the pressure-receiving platen 12 and the movable platen 2. The toggle link mechanism L includes a pair of first links La pivoted on the pressure-receiving platen 12; a pair of output links Lc pivoted on the movable platen 2; and a pair of second links Lb pivotally coupled to connecting rods which connect the first links La and the output links Lc. A crosshead 3 is coupled to the second links Lb.

Moreover, a mold-clamping drive section 22 is disposed between the pressure-receiving platen 12 and the crosshead 3. The mold clamping drive section 22 includes a ball screw mechanism 23, which consists of a ball screw 24 rotatably supported on the pressure-receiving platen 12 and a ball nut 25 in screw-engagement with the ball screw 24 and fixed to the crosshead 3; and a rotation drive mechanism section 26 for rotating the ball screw 24. The rotation drive mechanism section 26 includes a servomotor 4 for mold clamping; a rotary encoder 5 attached to the servomotor 4 so as to detect rotation of the servomotor 4; a drive gear 27 attached to a shaft of the servomotor 4; a driven gear 28 attached to the ball screw 24; and a timing belt 29 wound around the drive gear 27 and the driven gear 28.

By virtue of this configuration, when the servomotor 4 is operated, the drive gear 27 rotates, and rotation of the drive gear 27 is transmitted to the driven gear 28 via the timing belt 29 so as to rotate the ball screw 24, whereby the ball nut 25 advances or retracts. As a result, the crosshead 3, with which the ball nut 25 is integrated, advances or retracts, and the toggle link mechanism L is contracted or expanded, whereby the movable platen 2 moves in a mold opening direction (retracting direction) or in a mold closing direction (advancing direction). Reference numeral 30 denotes a molding machine controller, to which the mold clamping servomotor 4, the rotary encoder 5, the mold-thickness adjustment motor 20, and the rotary encoder 21 are connected.

Figure 6:
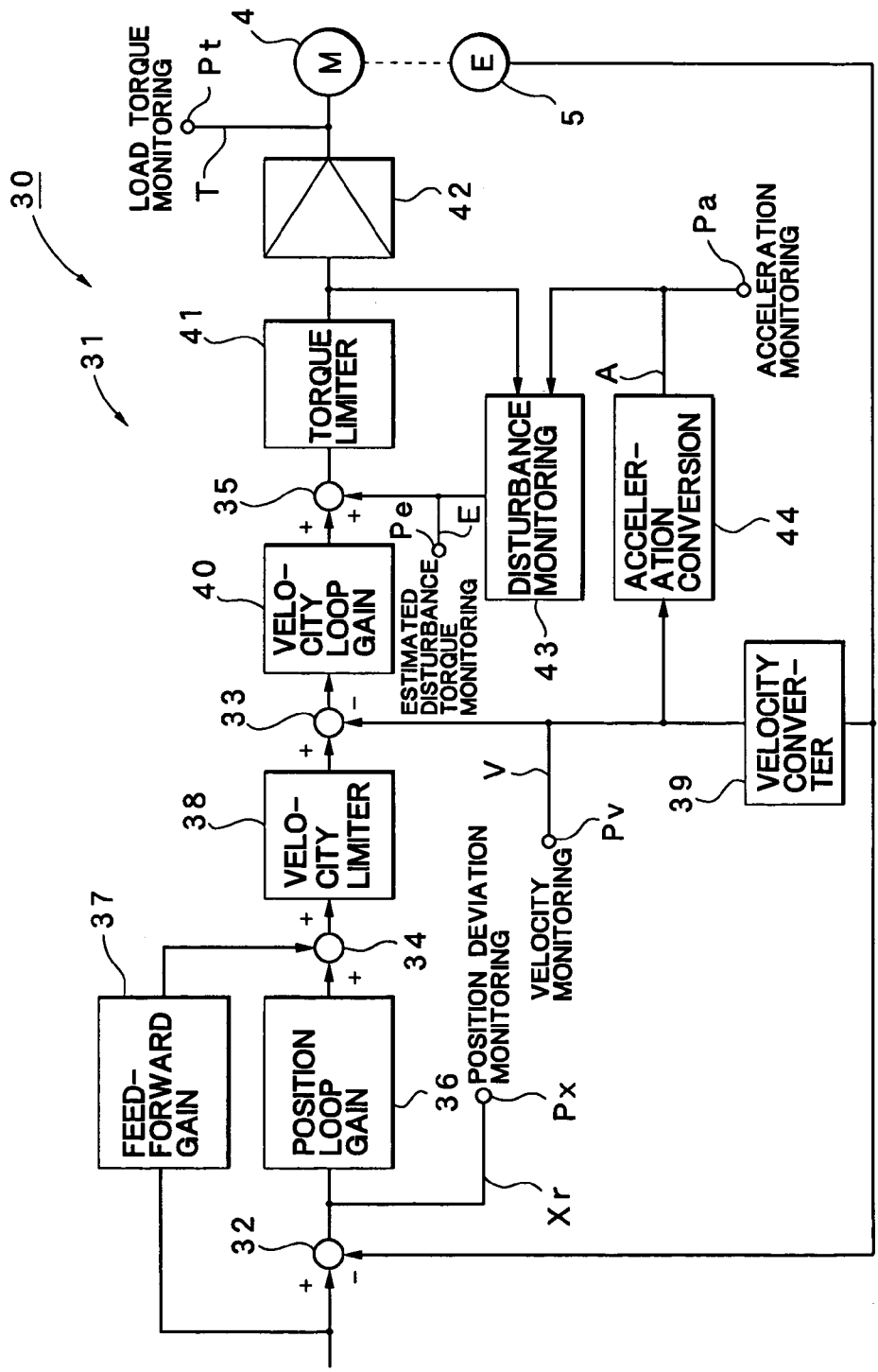
FIG. 6 is a block circuit diagram showing a portion of a molding machine controller provided for the toggle-type mold clamping apparatus, which controller performs the mold closure position detection method.

FIG. 6 shows a servo circuit 31, which is a portion of the molding machine controller 30. The servo circuit 31 includes deviation calculation sections 32 and 33; adders 34 and 35; a positional-loop-gain setting section 36; a feed-forward-gain setting unit 37; a velocity limiter 38, a velocity converter (differentiator) 39; a velocity-loop-gain setting section 40; a torque limiter 41; a driver 42; a disturbance monitoring section 43; and an acceleration converter (differentiator) 44. Thus, the system shown in FIG. 6 constitutes a servo control system (servo circuit 31). The above-mentioned mold clamping servomotor 4 is connected to the output side of the driver 42, and the rotary encoder 5 attached to the servomotor 4 is connected to the inverted input sections of the velocity converter 39 and the deviation calculation section 32. The non-inverted input section of the deviation calculation section 32 is connected to an unillustrated sequence controller.

In FIG. 6, Pt denotes a signal output terminal used for detection of load torque T generated at the time of closure of the mold 1; Pv denotes a signal output terminal used for detection of velocity V of the movable platen 2 at the time of closure of the mold 1; Pa denotes a signal output terminal used for detection of acceleration A of the movable platen 2 at the time of closure of the mold 1; Pe denotes a signal output terminal used for detection of estimated torque E generated by disturbances at the time of closure of the mold 1; and Px denotes a signal output terminal used for detection of position deviation Xr of the movable platen 2 at the time of closure of the mold 1. Notably, operations (functions) of the respective sections will be described in the following description of overall operation of the toggle-type mold clamping apparatus Mc.

Figure 7:
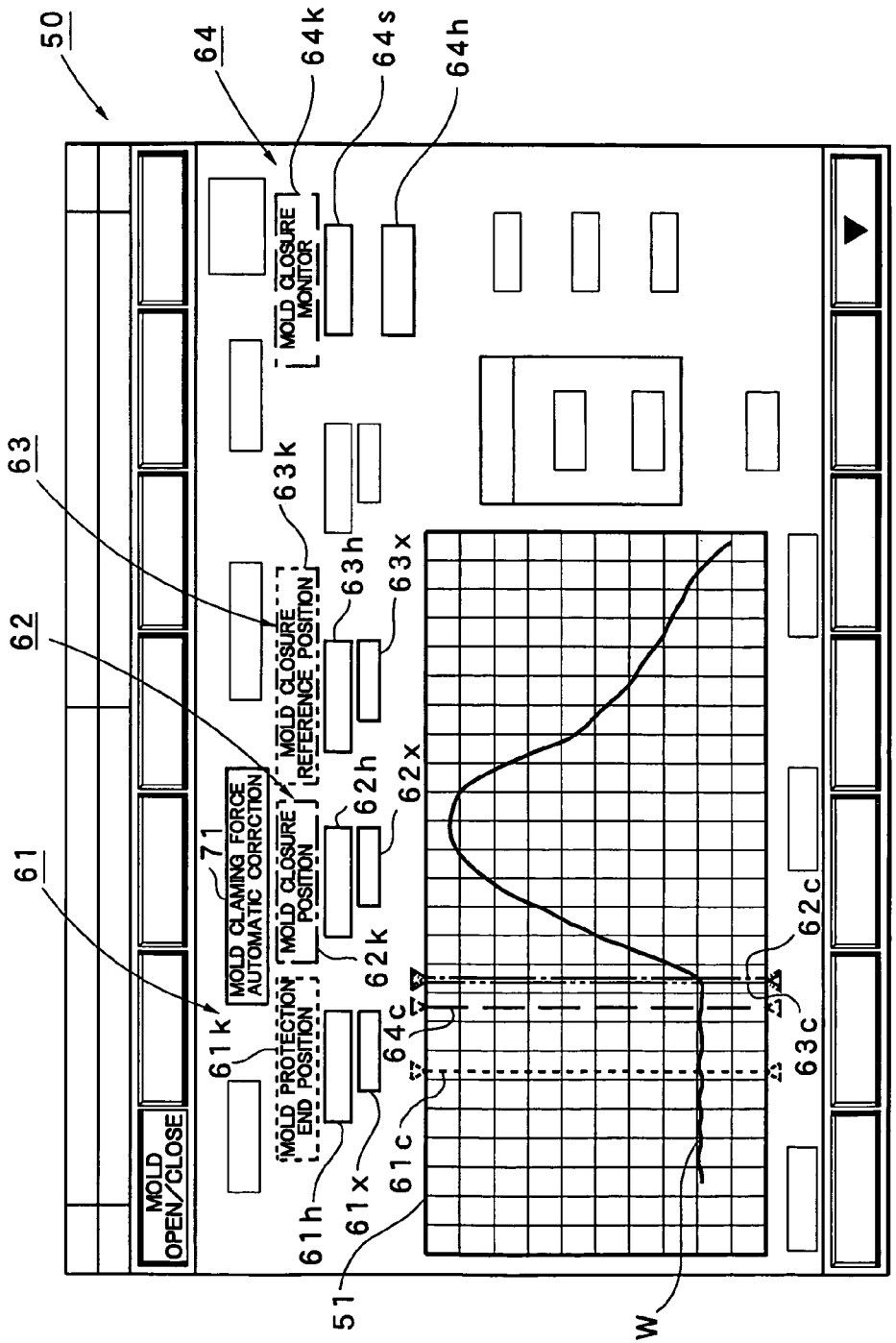
FIG. 7 is a view showing a display screen of a display unit provided on an injection molding machine which performs the mold closure position detection method.

FIG. 7 is a display screen 50 of a display unit attached to the side panel, or the like of the injection molding machine M. A touch panel is attached to the display screen 50, and various settings or other operations can be performed by use of this touch panel. The display screen 50 shown in FIG. 7 is a setting screen for mold opening and closing, and includes a graphic display section 51 for graphically displaying a curve W representing variation in load torque T. The display screen 50 further includes a numerical value display section 61 in relation to a mold protection end position, a numerical value display section 62 in relation to a mold closure position, a numerical value display section 63 in relation to a mold closure reference position, and a numerical value display section 64 in relation to a mold closure monitor end position.

In this case, the graphic display section 51 has a horizontal axis (X-axis) for position (mm) of the crosshead 3, and a vertical axis (Y-axis) for load torque T (%). Notably, the load torque T (%) is displayed such that the maximum torque is displayed as 100%. With this configuration, the magnitude of the load torque T corresponding to the position of the crosshead 3 is graphically displayed in the graphic display section 51 in the form of a variation curve W. Further, in the graphic display section 51, a cursor 61$c$ (pink) for indicating an end position Xe of a mold protection zone Zd1, a cursor 62$c$ (red) for indicating a detection value Dd of a mold closure position Cs, a cursor 63$c$ (blue) for indicating a reference value Ds of the mold closure position Cs, and a cursor 64$c$ (green) for indicating an end position Xf of a mold closure monitor zone, which serves as a second mold protection zone Zd2, are displayed by vertical lines of corresponding colors. The cursors 61$c$, 62$c$, 63$c$, and 64$c$ having different colors corresponding to the respective items enable an operator to easily and properly (reliably) know the positions corresponding to the respective items.

Figure 8:
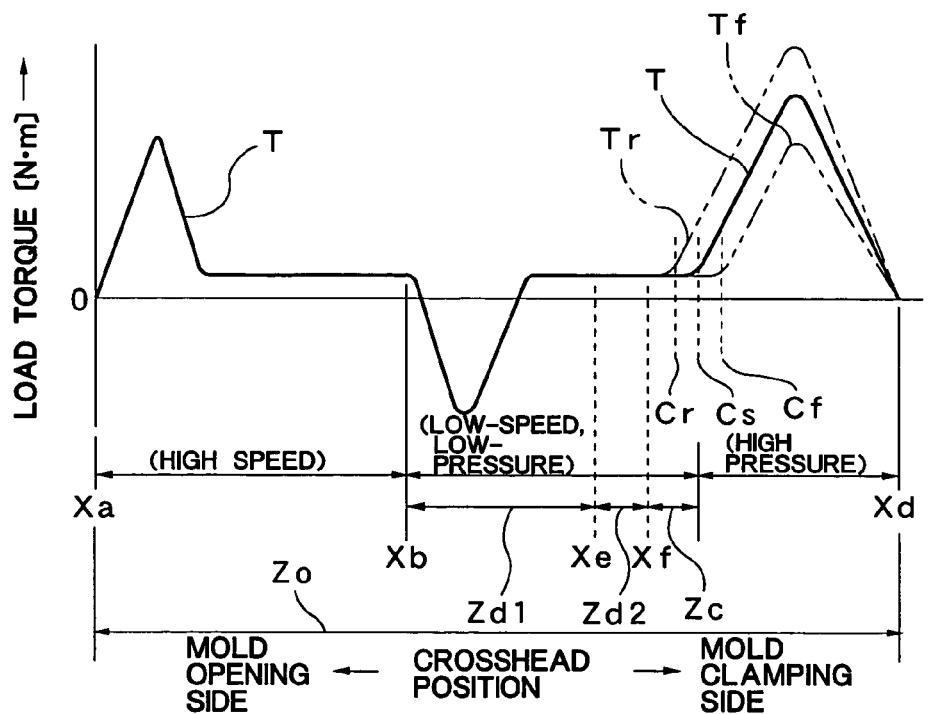
FIG. 8 is a graph showing variation in load torque with position of a crosshead, the graph being used for describing the mold closure position detection method.
Figure 9:
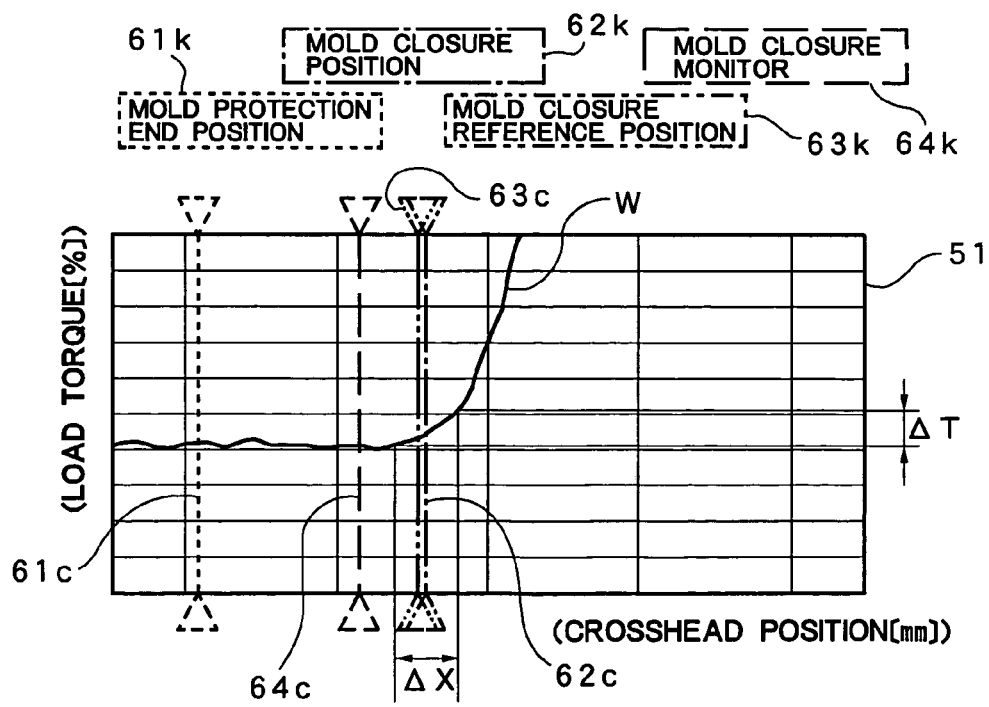
FIG. 9 is a view showing an another mode of display of the display unit screen provided on the injection molding machine which performs the mold closure position detection method.
Figure 10:
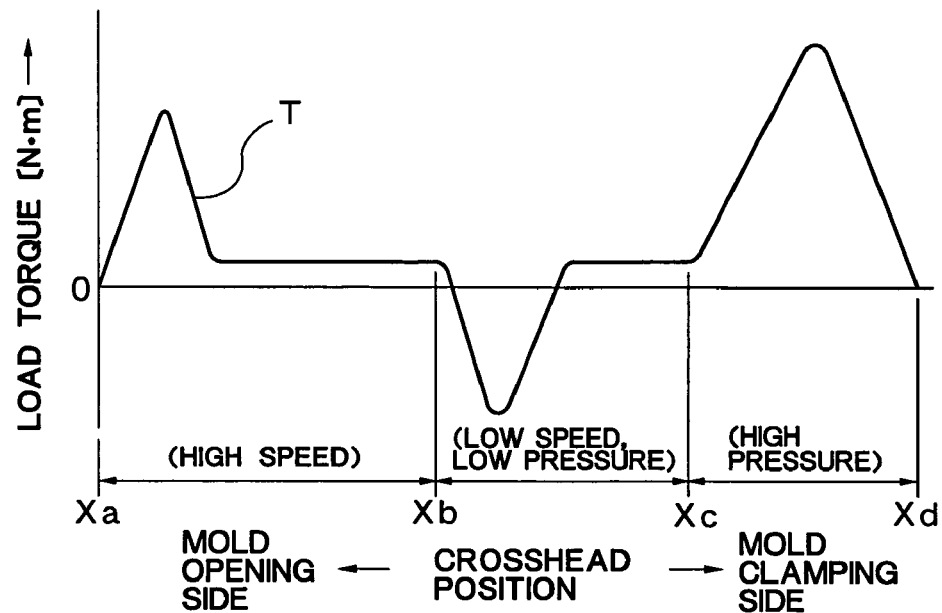
FIG. 10 is a graph showing variation in load torque with position of a crosshead, the graph being used for describing a conventional technique.
Figure 11:
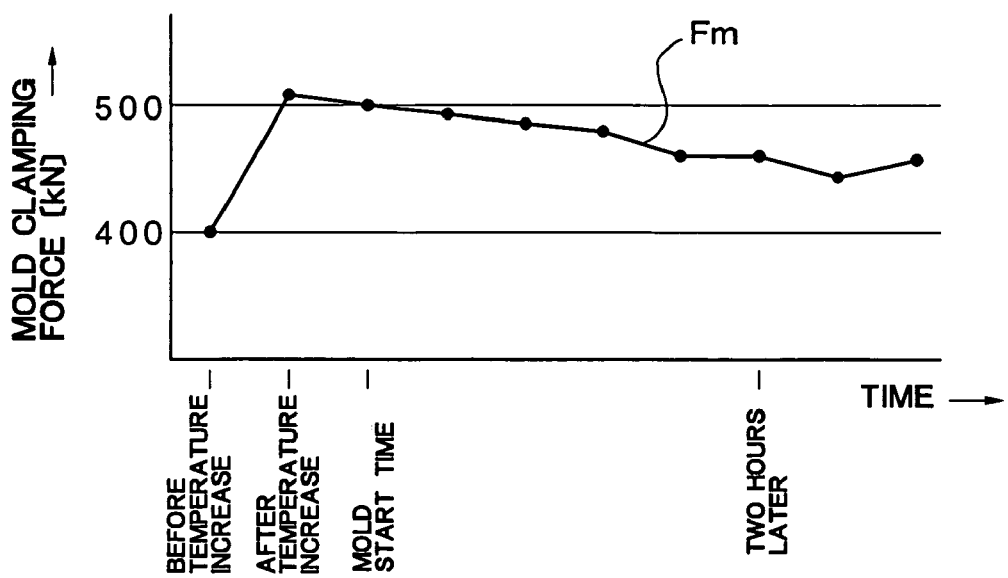
FIG. 11 is a graph showing variation in mold clamping force with time, the graph being used for describing the conventional technique.

Meanwhile, the numerical value display section 61 includes a first display subsection 61$h$ for numerically displaying the end position Xe of the mold protection zone Xd1 (see FIG. 8) by a position of the crosshead 3, and a second display subsection 61$x$ for numerically displaying a position of the movable platen 2 converted from that position of the crosshead 3. The numerical value display section 62 includes a first display subsection 62$h$ for numerically displaying the detection value Dd of the mold closure position Cs by a position of the crosshead 3, and a second display subsection 62$x$ for numerically displaying a position of the movable platen 2 converted from that position of the crosshead 3. The numerical value display section 63 includes a first display subsection 63$h$ for numerically displaying the reference value Ds of the mold closure position Cs by a position of the crosshead 3, and a second display subsection 63$x$ for numerically displaying a position of the movable platen 2 converted from that position of the crosshead 3. The numerical value display section 64 includes a first display subsection 64$h$ for numerically displaying the end position Xf of the mold closure monitor zone, which serves as the second mold protection zone Zd2, by a position of the crosshead 3, and an ON key 64$s$ for setting the end position Xf. The item names "mold protection end position," "mold closure position," "mold closure reference position," and "mold closure monitor" are displayed on respective positions above the numerical value display sections 61, 62, 63, and 64. Further, color frames 61$k$ (pink), 62$k$ (red), 63$k$ (blue), and 64$k$ (green) are displayed so as to surround the corresponding item names. The colors of these color frames 61$k$ (pink), 62$k$ (red), 63$k$ (blue), and 64$k$ (green) correspond to the colors of the cursors 61$c$ (pink), 62$c$ (red), 63$c$ (blue), and 64$c$ (green). By virtue of this color arrangement, the operator easily discerns which items correspond to the cursors 61$c$, 62$c$, 63$c$, and 64$c$. Notably, position of the crosshead 3 can be easily converted to position of the movable platen 2 by use of a known conversion formula. Further, FIG. 9 shows a different display mode in which the scales of the horizontal axis (X-axis) and vertical axis (Y-axis) of the graphic display section 51 are changed.

Next, operation (function) of the toggle-type mold clamping apparatus Mc, including a mold closure position detection method according to the present embodiment, will be described with reference to FIGS. 1 to 9.

The molding machine controller 30 has a closure position detection mode for detecting the mold closure position Cs. Notably, the mold closure position Cs is a position at which the movable mold half 1$m$ and the stationary mold half 1$c$ come into mutual contact. In the closure position detection mode, the molding machine controller 30 detects an amount of movement (displacement amount) of the crosshead 3 at the time of closure of the mold 1, and a variation in a physical quantity at the time of closure of the mold 1, obtains a rate of variation ΔT in the physical quantity per the unit movement amount (predetermined movement amount) ΔX of the crosshead 3, and detects, as a mold closure position Cs, a position of the crosshead 3 when the variation rate ΔT reaches a preset threshold rate Ts.

In this case, the variation rate ΔT may be a variation amount. That is, the variation rate ΔT can be a variation amount ΔT per unit movement amount ΔX or a variation rate obtained from ΔT/ΔX. Further, load torque T is used as a physical quantity. A signal indicative of the load torque T is obtained from the signal output terminal Pt. The signal obtained from the signal output terminal Pt is fed to the molding machine controller 30. Further, the movement amount of the crosshead 3 is detected by use of encoder pulses output from the rotary encoder 5 for detecting rotation of the servomotor 4.

Meanwhile, the above-mentioned threshold rate Ts is set in the molding machine controller 30. As shown in FIG. 9, the threshold rate Ts is used to detect, as the mold closure position Cs, the position at which the variation rate (increase rate) ΔT of the load torque T per the unit movement amount ΔX of the crosshead 3 reaches the threshold rate Ts. Therefore, the threshold rate Ts can be properly set through an experiment, adjustment, etc. Since the load torque T is displayed such that the maximum torque is displayed as 100% the threshold rate Ts can be set as a percent value. For example, in the case where the unit movement amount ΔT of the crosshead 3 is set to a few millimeters, and the variation rate (increase rate) ΔT of the load torque T at that time is obtained, the threshold rate Ts for the variation rate ΔT may be set to about 1%.

Next, specific processing steps will be described. First, detection of the mold closure position Cs is performed in the closure position detection mode. The processing steps for this closure position detection mode will now be described in accordance with the flowchart shown in FIG. 1.

The mold 1 is assumed to be presently located at a mold open position (full open position). Therefore, the crosshead 3 of the toggle mechanism L is located at a mold open position Xa shown in FIG. 8. Upon start of mold clamping operation, the mold clamping servomotor 4 is operated, so that the crosshead 3 advances and the movable platen 2 advances from the mold open position in a mold closing direction. At this time, high-speed mold closing, in which the movable platen 2 advances at high speed, is first performed.

In this case, the servo circuit 31 performs velocity control and position control for the movable platen 2 (crosshead 3). That is, a position instruction value is fed from the sequence controller to the deviation calculation section 32 of the servo circuit 31, and is compared with the position detection value obtained on the basis of encoder pulses from the rotary encoder 5. As a result, a position deviation Xr is output from the deviation calculation section 32, and feedback control for position is performed on the basis of the position deviation Xr.

The position deviation Xr is amplified by means of the positional-loop-gain setting section 36 and fed to an input section of the adder 34. Moreover, the position instruction value is amplified by means of the feed-forward-gain setting section 37 and fed to another input section of the adder 34. An output of the adder 34 is fed to a non-inverted input section of the deviation calculation section 33 via the velocity limiter 38. Meanwhile, the position detection value is differentiated by means of the velocity converter 39 to thereby be converted to a velocity (velocity detection value) V, which is fed to an inverted input section of the deviation calculation section 33. As a result, a velocity deviation is output from the deviation calculation section 33, and feedback control for velocity is performed on the basis of the velocity deviation. Notably, the velocity V is limited by means of the velocity limiter 38.

The velocity deviation is amplified by means of the velocity-loop-gain setting section 40 and fed to an input section of the adder 35. Meanwhile, the velocity V is differentiated by means of the acceleration converter 44 to thereby be converted to an acceleration (acceleration detection value) A, which is fed to an input section of the disturbance monitoring section 43. The disturbance monitoring section 43 monitors the acceleration A. When the acceleration A anomalously changes because of a certain cause (disturbance), the disturbance monitoring section 43 outputs an estimated torque (torque value) E for accelerating return to the normal. This estimated torque E is fed to an input section of the adder 35 as a correction value. As a result, a torque instruction (instruction value) is output from the adder 35 and fed to the driver 42 via the torque limiter 41. With this, the servomotor 4 is driven and controlled, whereby position control and velocity control for the movable platen 2 (crosshead 3) are performed. Notably, the torque instruction output from the torque limiter 41 is fed back to an input section of the disturbance monitoring section 43.

Meanwhile, the crosshead 3 reaches a preset low-speed, low pressure changeover point Xb as a result of advancement of the movable platen 2 in the mold closing direction, and operation for low-speed, low-pressure mold closing is started (step S1). The operation for low-speed, low-pressure mold closing is performed for mold protection (e.g., foreign object detection) first in a mold protection zone Zd1, which is set before a second mold protection zone Zd2, which will be described later, as shown in FIG. 8. Specifically, in the mold protection zone Zd1, the magnitude of the load torque T is monitored. When the magnitude of the load torque T exceeds a preset threshold, a foreign object is determined to be present, and processing for anomaly such as mold opening control is performed.

As shown in FIG. 9 (FIG. 7), the end position Xe of the mold protection zone Zd1 is previously set by means of the numerical value display section 61, which has a setting function. Since this end position Xe is provisionally set before detection of the correct mold closure position Cs (reference value Ds), the end position Xe can be set to be located before a predicted mold closure position with some margin. An operator numerically sets, as the end position Xe, a corresponding position of the crosshead 3 by use of the first display subsection 61h. In this case, a known setting method can be employed so as to allow the operator to enter a numerical value by use of a ten-key window, which is displayed, for example, when the first display subsection 61h is touched. In response to the entry of the end position Xe, the cursor 61c is displayed in the graphic display section 51 at a position corresponding to the end position Xe. As described above, the color (pink) of the cursor 61c is the same as that of the color frame 61k displayed in the numerical value display section 61. Therefore, the operator can easily and correctly know the end position Xe from the cursor 61c, and can easily and correctly know that the end position Xe is related to the mold protection zone Zd1.

When setting operation in relation to the mold protection zone Zd1 ends, processing for detecting the mold closure position Cs of the mold 1 is performed. Specifically, increase rate monitoring process for monitoring the increase rate ΔT is performed so as to detect the mold closure position Cs (step SP). Notably, at this point in time the second mold protection zone Zd1, shown in FIG. 8 and serving as a mold closure monitor zone, has not yet been set. In the increase rate monitoring processing, the molding machine controller 30 first detects the position of the crosshead 3 (step S2). The position of the crosshead 3 is detected by use of encoder pulses output from the rotary encoder 5 for detecting rotation of the mold clamping servomotor 4. In the present embodiment, the rotary encoder 5 is of an incremental type, and detects the absolute position from the number of encoder pulses counted from a reference position. Use of such a rotary encoder 5 eliminates necessity of separate position detection means for detecting the position of the crosshead 3. As described above, the mold closure position Cs can be detected accurately by making use of the displacement amount (movement amount) of the crosshead 3, whose movement amount is greater than that of the movable platen 2, whereby accurate detection of the mold closure position Cs becomes possible. As a result, the amount of variation in mold clamping force Fm, which will be described later, can be detected accurately, and thus, accurate correction of the mold clamping force Fm becomes possible.

Further, the molding machine controller 30 acquires the load torque T at sampling intervals of, for example, 500 µsec, and obtains the average of N sampled values of the load torque T through averaging processing (steps S3 and S4). As a result, as shown in FIGS. 7 and 9, the obtained load torque T is graphically displayed in the graphic display section 51 as a variation curve W, which shows variation in the load torque T with the detected position of the crosshead 3.

Moreover, from the displacement amount (movement amount) of the crosshead 3 and the variation amount of the load torque T, the increase amount (increase rate) $\Delta T$ of the load torque T with respect to the unit movement amount $\Delta X$ of the crosshead 3 is obtained (step S5). In the present embodiment, the unit movement amount $\Delta X$ of the crosshead 3 is set to a few millimeters, and a corresponding increase amount (increase rate) $\Delta T$ (%) of the load torque T is obtained. The increase rate $\Delta T$ is monitored so as to determine whether the increase rate $\Delta T$ reaches the preset threshold rate Ts. When the increase rate $\Delta T$ reaches the preset threshold rate Ts, the position of the crosshead 3 at that time is acquired as the mold closure position Cs (steps S6 and S7). Further, the acquired mold closure position Cs is set or stored as a reference value Ds (step S8).

Meanwhile, the reference value Ds is displayed by means of the cursor 63c in the graphic display section 51 of the display screen 50. As described above, the color (blue) of the cursor 63c is the same as that of the color frame 63k displayed in the numerical value display section 63. Therefore, the operator can easily and correctly know the reference value Ds from the cursor 63c, and can easily and correctly know that the reference value Ds is related to the mold closure position Cs. The reference value Ds is numerically displayed in the first display subsection 63h, and is converted to a position of the movable platen 2, which is displayed in the second display subsection 63x. The above is the basic operation of the closure position detection mode, and the actual reference value Ds (and detection value Dd) can be obtained by performing the processing for the closure position detection mode a plurality of times and averaging a plurality of obtained closure positions.

Further, while referring to the set reference value Ds, the operator manually sets the end position Xf of the mold closure monitor-zone (the second mold protection zone Zd2) by use of the numerical value display section 64, which has a setting function (step S9). Specifically, the operator numerically sets the end position Xf of the second mold protection zone Zd2 in the display subsection 67h, while referring to the cursor 63c which is displayed in the graphic display section 51 and is related to the reference value Ds, the numerical value displayed in the first display subsection 63h, etc. In this case, the end position Xf is set by the position of the crosshead 3. Further, the end position Xf is set in consideration of, in particular, the thickness of a molded product. For example, in the case where the thickness of the molded product is 0.1 mm, the end position Xf can be set to be located between the mold closure position Cs and a position located before the mold closure position Cs by 0.1 mm. In the present embodiment, the end position Xf is set by the position of the crosshead 3, which moves in a greater amount than does the movable platen 2. Therefore, the end position Xf can be set easily and accurately even in the case of a sheet-like molded product having a thickness of about 0.1 mm.

After having set the end position Xf to the display subsection 64h, the operator touches the ON key 64s, whereby the end position Xf of the mold closure monitor zone, serving as the second mold protection zone Zd2, is displayed in the graphic display section 51 by means of the cursor 64c. As described above, the color (green) of the cursor 64c is the same as that of the color frame 64k displayed in the numerical value display section (mold closure monitor zone setting section) 64. Therefore, the operator can easily and correctly know the end position Xf from the cursor 64c, and can easily and correctly know that the end position Xf is related to the mold closure monitor zone, serving as the second mold protection zone Zd2.

Figure 1:
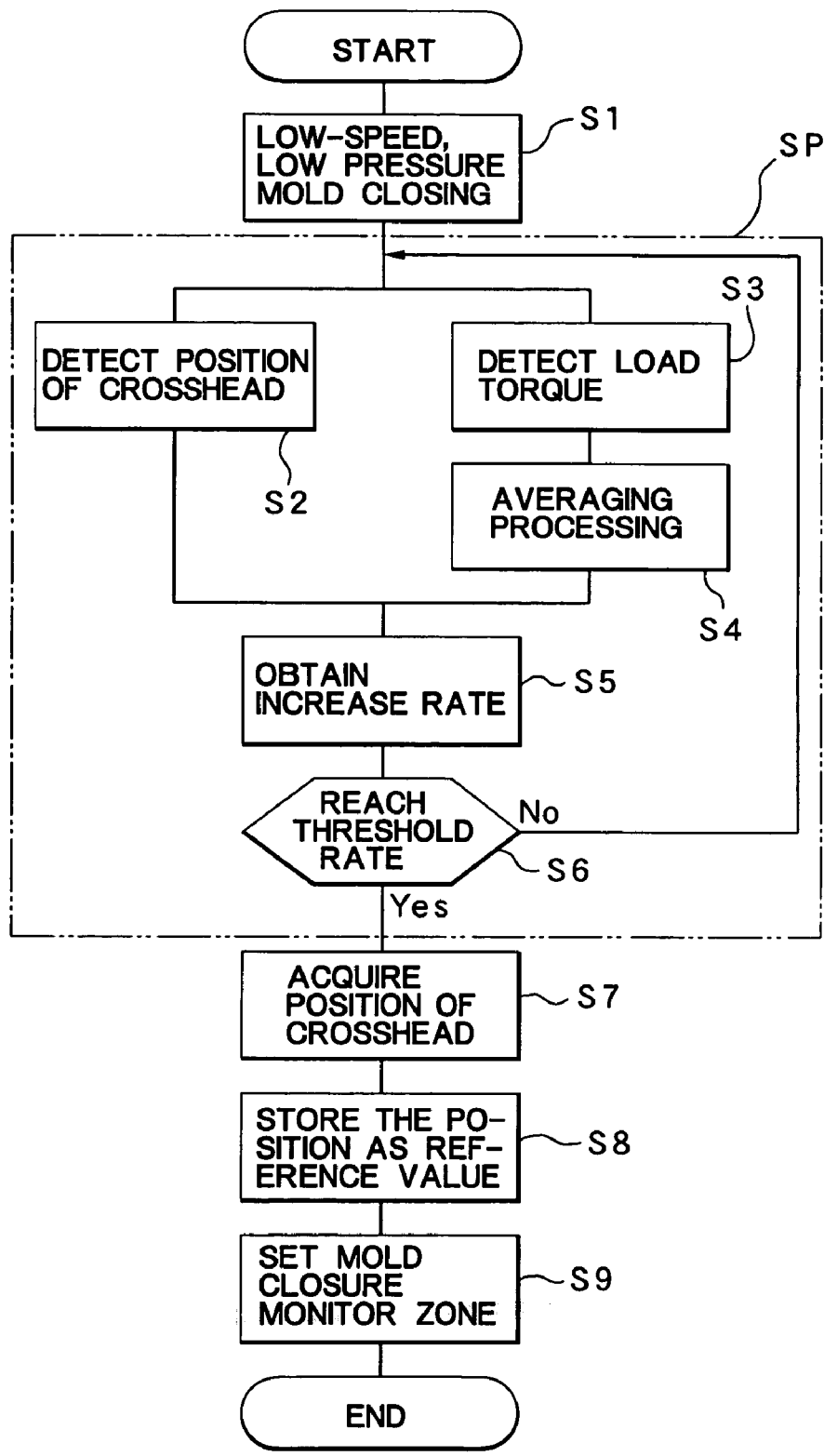
FIG. 1 is a flowchart showing processing steps of the mold closure position detection method according to an embodiment of the present invention, the steps being for a closure position detection mode to be performed at the time of initial setting.
Figure 2:
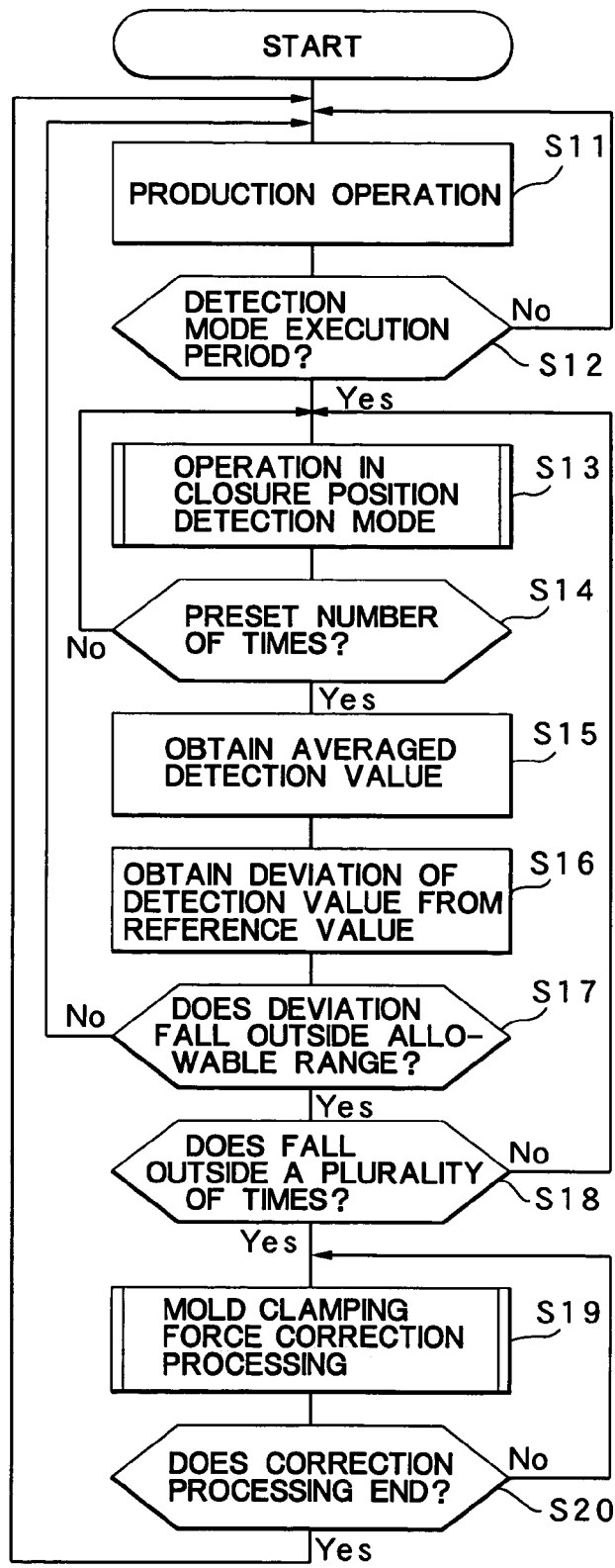
FIG. 2 is a flowchart showing the processing steps of a mold clamping force correction method using the mold closure position detection method.
Figure 3:
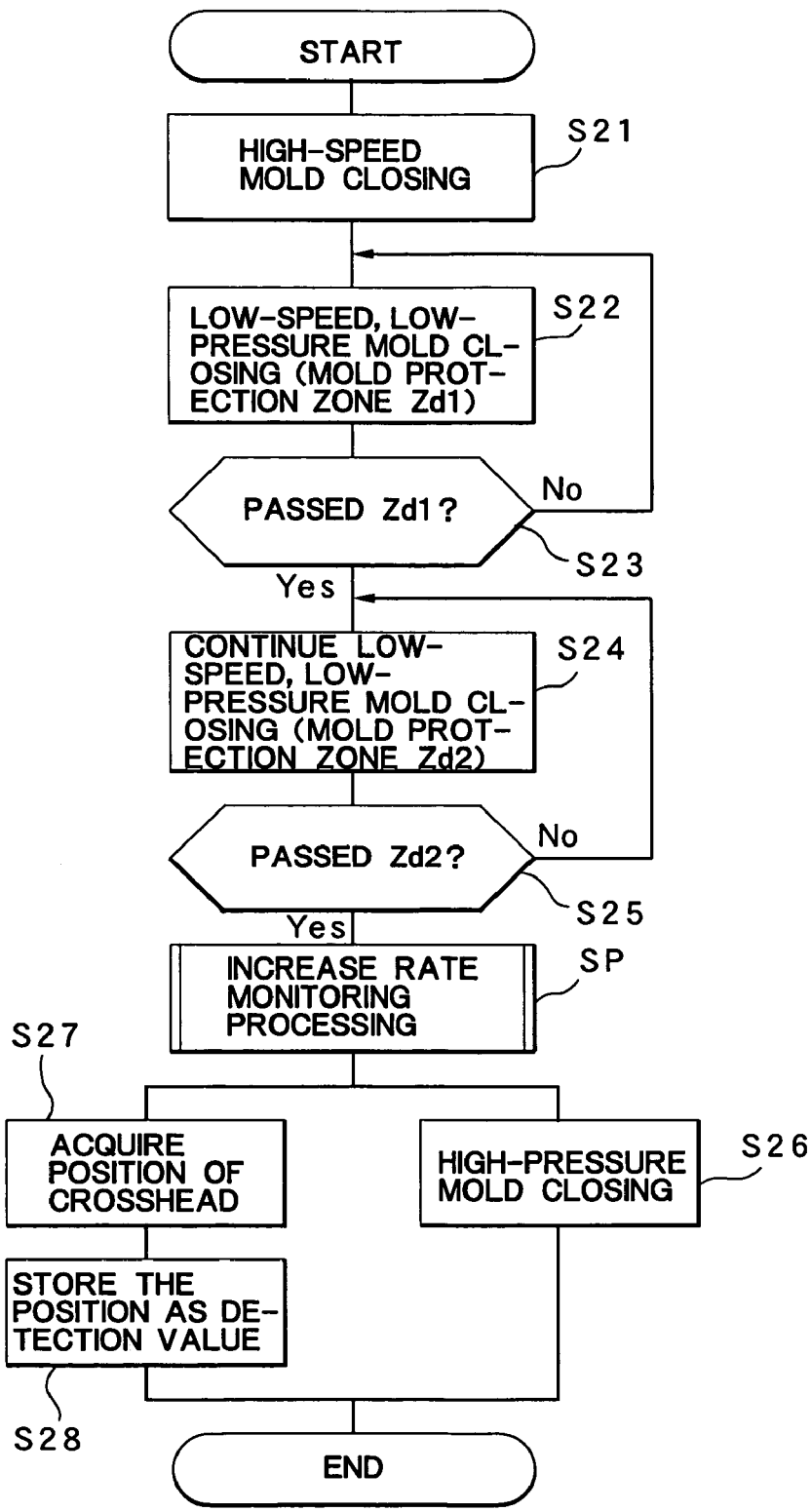
FIG. 3 is a flowchart showing the processing steps for the closure position detection mode which uses the mold closure position detection method and which is performed at the time of production operation.
Figure 4:
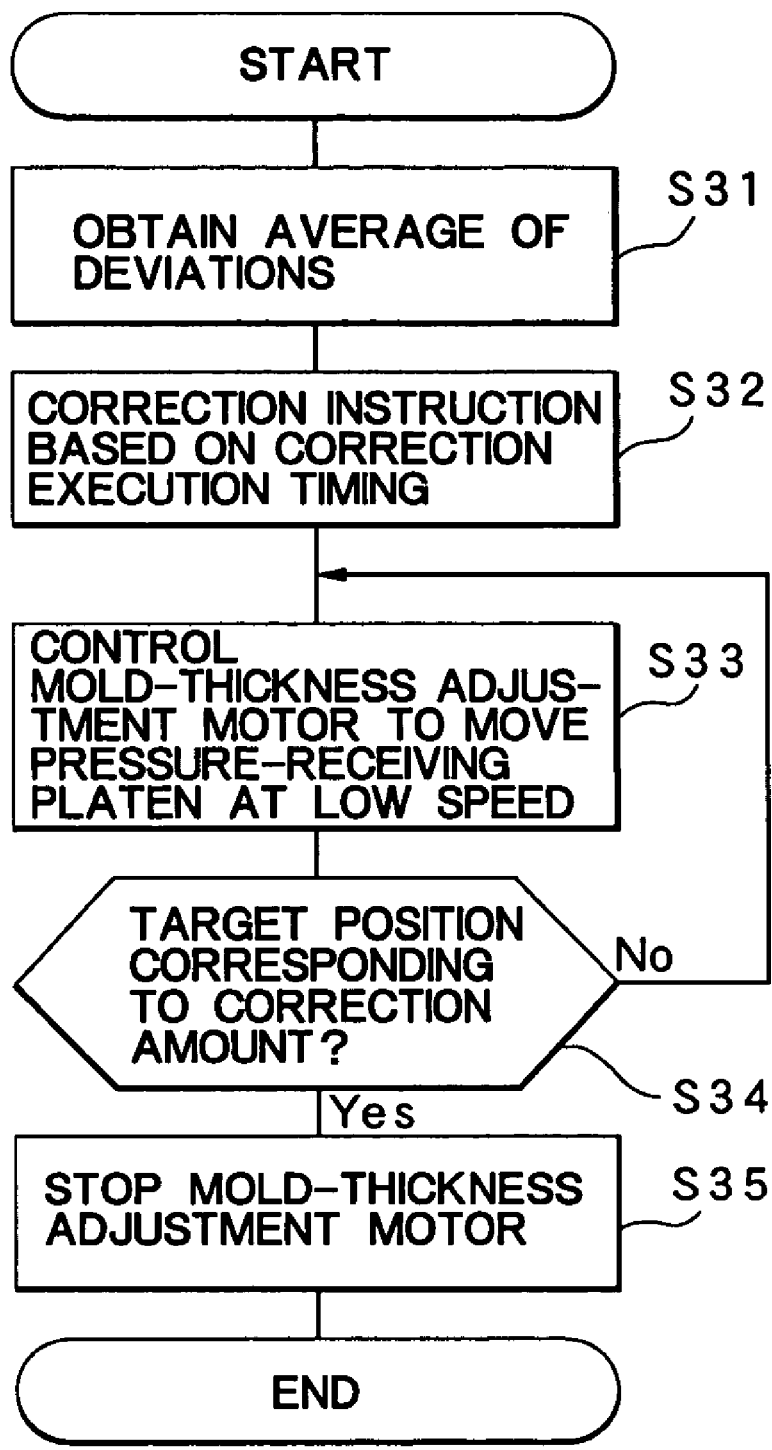
FIG. 4 is a flowchart showing processing steps for correcting molding clamping force by use of the mold closure position detection method.

Next, operation during production operation will be described in accordance with the flowchart of FIG. 2 (FIG. 3 and FIG. 4).

Production operation is assumed to be presently performed in an automatic molding mode (step S11). In this case, the above-described reference value Ds has already been set. During production operation, when a preset time for detection of closure position or a preset number of shots for detection of closure position is reached, operation for the closure position detection mode is automatically performed (steps S12 and S13). The intervals at which operation for the closure position detection mode is performed can be set in consideration of the degree of change in the mold clamping force F in an actual machine. For example, the operation for the closure position detection mode may be performed for every shot or for every predetermined number of shots, or upon elapse of a predetermined period of time.

Next, the processing steps for the closure position detection mode during the production operation will be described in accordance with the flowchart of FIG. 3. Now, the mold 1 is assumed to be presently located at a mold open position (full open position). Therefore, the crosshead 3 of the toggle mechanism L is located at the mold open position Xa shown in FIG. 8. Upon start of mold clamping operation, the servomotor 4 is operated, so that the movable platen 2 advances from the mold open position in the mold closing direction. At this time, high-speed mold closing, in which the movable platen 2 advances at high speed, is first performed (step S21). When the crosshead 3 reaches a preset low-speed, low-pressure changeover point Xb as a result of advancement of the movable platen 2 in the mold closing direction, low-speed, low-pressure mold closing is performed (step S22). In this low-speed, low-pressure mold closing, as shown in FIG. 8, processing for detecting anomaly such as presence of a foreign object is performed in the mold protection zone Zd1.

Upon passage of the mold protection zone Zd1, in the mold closure monitor zone serving as the second mold protection zone Zd2, monitoring processing for determining whether a molded product is caught between the mold halves is performed (steps S23, S24, and S25). As described above, in the case where the thickness of a product to be molded is 0.1 mm, the end position Xf of the mold closure monitor zone is set to be located between the mold closure position Cs and a position located before the mold closure position Cs by 0.1 mm. This enables detection of a thin sheet-like molded product remaining within the mold 1 without being ejected during mold opening. In actuality, even a sheet-like molded product having a thickness of about 0.09 mm can be detected without fail.

Meanwhile, after passage of the mold closure monitor zone, in the closure position detection zone Zc, processing for detecting the mold closure position Cs of the mold 1 is performed (steps S25 and SP). This detection processing is the same as in step SP shown in the flowchart of FIG. 1 and used for setting the reference value Ds. When the increase rate $\Delta T$ is detected to have reached the preset threshold ratio Ts by the processing for detecting the mold closure position Cs in the closure position detection zone Zc, high-pressure mold clamping is performed so as to clamp the mold 1 under high pressure (step S26). Simultaneously, the position of the crosshead 3 when the increase rate $\Delta T$ reaches the preset threshold ratio Ts is detected, and stores that position as a detection value Dd of the mold closure position Cs (steps S27 and S28). As can be understood from the above, setting of the mold protection zones Zd1 and Zd2 and the closure position detection zone Zc enables the processing for detecting the mold closure position Cs to be performed after passage of the mold protection zones Zd1 and Zd2. Therefore, the processing for protecting the mold 1 and the processing for detecting the mold closure position Cs can be performed in a stable and reliable manner while occurrence of interference therebetween is prevented.

The detected detection value Dd is numerically displayed in the first display subsection 62h and the second display subsection 62x of the numerical value display section 62 of the display screen 50, and is displayed in the graphic display section 51 by means of the cursor 62c. As described above, the color (red) of the cursor 62c is the same as that of the color frame 62k displayed in the numerical value display section 62. Therefore, the operator can easily and correctly know the detection value Dd from the cursor 62c, and can easily and correctly know that the detection value Dd is related to the mold closure position Cs.

The operation for the closure position detection mode is performed a predetermined number of times, and the detection value Dd is obtained from the average of a plurality of obtained values of the mold closure position Cs (steps S13, S14, and S15). As a result, the obtained detection value Dd is highly reliable and free of noise. Subsequently, a deviation Ke of the detection value Dd from the preset reference value Ds; i.e. Ke=Ds−Dd, is obtained (step S16). After that, the end position Xe of the mold protection zone Zd1 and the end position Xf of the mold closure monitor zone serving as the second mold protection zone Zd2 are corrected on the basis of the deviation Ke. The correction of the end positions Xe and Xf is performed as follows. Imaginary lines in FIG. 8 show load torque variations Tf and Tr which occur when the mold clamping force Fm changes. The load torque variation Tr represents a load torque variation which occurs when the mold 1 is heated and thermally expanded; and a position before the correct mold closure position Cs is detected as a mold closure position Cr. In this case, the mold clamping force Fm increases. Accordingly, the end position Xf (Xe) is corrected such that the distance from the mold open position (origin) decreases by an amount corresponding to the deviation Ke. Specifically, when the mold closure position Cs shifts, the end position Xf (Xe) is corrected in such a manner that the above-described closure position detection zone Zc between the end position Xf (Xe) and the mold closure position Cs shown in FIG. 8 is maintained constant.

In particular, the load torque variation Tf shows the case where the movable mold half 1m starts to come into contact with the stationary mold half 1c before the end position Xf (Xe). In this case, if correction of the end position Xf (Xe) is not performed, it becomes difficult to determine whether the load torque variation Tr occurs because of contact between the movable mold half 1m and the stationary mold half 1c during a normal operation or catching of a foreign object or the like, whereby erroneous detection may occur. However, when the correction of the end position Xf (Xe) is performed, the processing of detecting a foreign object or the like and the processing of detecting the mold closure position Cs according to the present embodiment can be performed in a stable and reliable manner, without occurrence of interference therebetween.

Similarly, the load torque variation Tf represents a load torque variation which occurs when the tie bars 13 are heated and thermally expanded; and a position after the correct mold closure position Cs is detected as a mold closure position Cf. In this case, the mold clamping force Fm decreases. Accordingly, the end position Xf (Xe) is corrected such that the distance from the mold open position increases by an amount corresponding to the deviation Ke. In FIG. 8, Xd represents a mold claming end position. Notably, even the mold closure positions Cs, Cf, and Cr, which relate to such variation in the mold clamping force Fm, can be accurately detected by means of the above-described closure position detection mode.

Meanwhile, since an allowable range Re in relation to the deviation Ke has been previously set in the molding machine controller 30, the allowable range Re is compared with the deviation Ke so as to determine whether the deviation Ke falls outside the allowable range Re. When the deviation Ke falls within the allowable range Re, correction for the mold clamping force Fm is not performed. Accordingly, the production operation is continued under the same conditions (steps S17 and S11).

When the deviation Ke falls outside the allowable range Re, the detection value Dd is obtained again (steps S17, S18, and S13). That is, in the present embodiment, the detection value Dd is continuously obtained a plurality of times; and when the deviation Ke successively falls outside the allowable range Re a plurality of times, correction for the mold clamping force Fm is performed (step S19 and S20). For example, correction for the mold clamping force Fm is performed when two detection values Dd are successively detected and two deviations Ke obtained therefrom fall outside the allowable range Re. Accordingly, in the case where the deviation Ke falls outside the allowable range Re only one time, the deviation Ke is determined to have been produced a temporary factor such as disturbance, and correction is not performed. This operation enhances the stability and reliability of correction.

Next, the processing steps for correction will be described in accordance with the flowchart of FIG. 4. Since in the present embodiment correction is performed when the deviation Ke falls outside the allowable range Re a plurality of times (e.g., two times), a plurality of the deviations Ke are obtained. Accordingly, in the present embodiment, the deviations Ke are averaged so as to obtain a mean value (step S31). Notably, in the case where a plurality of deviations Ke are detected, their mean value or the latest value may be used. Since the deviation Ke is a deviation of the position of the crosshead 3, it is converted to a deviation of the position of the movable platen 2 by use of a known conversion formula. With this operation, a correction amount Ks for the movable platen 2 is obtained. The pressure-receiving platen 12 is displaced by the correction amount Ks so as to perform correction for canceling the deviation Ke.

In this case, the correction processing is performed at a preset specific timing without interruption of the molding cycle (step S32). Any of periods other than the high-pressure mold clamping period; specifically, the molding opening period, the ejection period, the intermediate period, or the like, can be used as the specific timing which does not interrupt the molding cycle. Accordingly, for example, the ejection period is assumed to be set as a period for performing the correction processing. A correction instruction is output at the start of the ejection period, and the correction processing is executed in accordance with the correction instruction.

The correction processing is performed as follows. First, the mold-thickness adjustment motor 20 is driven and controlled on the basis of the correction amount Ks, to thereby move the pressure-receiving platen 12 in a direction for eliminating the deviation Ke (step S33). At this time, the pressure-receiving platen 12 is moved at a speed lower than the ordinary speed. The position of the pressure-receiving platen 12 is detected by use of encoder pulses output from the rotary encoder 21 attached to the mold-thickness adjustment motor 20, and feedback control for position is performed. The rotary encoder 21 is an incremental encoder; and the absolute position is detected on the basis of the number of generated encoder pulses counted from the reference position. When the pressure-receiving platen 12 has been moved to a target position corresponding to the correction amount Ks (the deviation Ke), the mold-thickness adjustment motor 20 is stopped (steps S34 and S35). By virtue of the above-mentioned automatic correction processing, timely and quick correction becomes possible. The correction processing may be performed by making use of an existing automatic mold clamping force setting function (automatic mold thickness adjustment function) of the toggle-type mold clamping apparatus Mc. The automatic mold clamping force setting function is used, for example, at the time of mold exchange so as to set a target value of mold clamping force in an initial stage, to thereby automatically set the mold clamping force. When such an existing automatic mold clamping force setting function is utilized, more accurate correction can be performed, and cost can be lowered.

Notably, instead of the above-mentioned automatic correction, manual correction by an operator is possible. In this case, an allowable range Re is previously set for the deviation Ke, and when the deviation Ke has deviated from the allowable range Re, such even is reported by means of warning or the like. In response to this, the operator can perform manual correction. This enables the operator to perform correction by making use of his/her experience and know-how. In addition, depending on the type of products to be molded, the operator can decide not to perform correction, while giving priority to production. Therefore, production operation (automatic molding) continues until the operator performs an operation for correction. Such correction modes can be previously selected by use of a selection key 71 on the display screen 50 of the display unit.

In the mold closure position detection method for a clamping apparatus according to the present embodiment, since the mold closure position Cs is detected by use of the variation rate $\Delta T$, detection can be performed in a more accurate and more stable manner as compared with the method in which a physical quantity itself (absolute value) is compared with a threshold value for detection. That is, in the method in which a physical quantity itself is compared with a threshold value for detection, the detection is directly influenced by disturbances such as drift, and therefore, accurate and stable detection is impossible. In addition, when mold closing speed or mold clamping force is changed as a result of replacement of a mold, resetting and fine adjustment must be performed frequently. Moreover, when resetting and fine adjustment are insufficient, erroneous detection or detection failure occurs. In contrast, in the present invention, since resetting and fine adjustment are greatly reduced, such a drawback can be avoided. In addition, since mold thickness detection means, such as a scale and a position detector, for directly detecting the thickness of the mold 1 becomes unnecessary, the number of parts can be reduced so as to lower cost. Moreover, the structure around the mold 1 can be prevented from becoming complex. Moreover, the mold closure position Cs can be detected accurately by making use of the displacement amount (movement amount) of the crosshead 3, whose movement amount is greater than that of the movable platen 2. As a result, the amount of variation in mold clamping force Fm can be detected accurately, and thus, accurate correction of the mold clamping force Fm becomes possible.

While the present invention has been described with reference to the preferred embodiment, the present invention is not limited thereto. Regarding details of the method, configuration, numerical values, among others, modifications and any omission or addition may be possible as needed without departing from the scope of the invention.

For example, anomaly such as catching of a foreign object encompasses not only catching of a molded product between the mold halves constituting the mold 1, but also other different types of anomalies such as a failure or partial breakage of the mold 1 or the like. In the above-described embodiment, the load torque T is detected by making use of the output (torque monitor) of the driver 42. However, the load torque T may be detected by making use of a torque instruction, which is an input of the torque limiter 41. When the closure position detection mode processing and the correction processing are to be performed, if necessary, the automatic molding (production operation) may be temporarily stopped, and then resumed after completion of the closure position detection mode processing and the correction processing. In each correction operation, correction may be performed by use of the entire correction amount Ks or a portion of the correction amount (Ks×k). Specifically, in the case where the control system becomes unstable (e.g., generation of hunting) as a result of correction by use of the entire correction amount Ks, correction may be performed by use of a correction amount which is obtained by multiplying the correction amount Ks by a constant k smaller than 1 (in general, 0.1<k<1) and which is made smaller than the deviation Ke; i.e., the value of Ks×k. In the above-described embodiment, the load torque T, which changes upon closure of the mold 1, is used as a physical quantity used for detection of the mold closure position Cs. However, examples of other usable physical quantities include velocity V of the crosshead 3 at the time of closure of the mold 1, acceleration A of the crosshead 3 at the time of closure of the mold 1, estimated torque E generated because of disturbance at the time of closure of the mold 1, and positional deviation Xr of the crosshead 3 at the time of closure of the mold 1. These physical quantities, including the load torque T, may be used singly or in combination. When these physical quantities are used in combination, reliability can be enhanced further. In the above-described embodiment, the movement amount (displacement amount) of the crosshead 3 is used as a displace amount of the movable platen 2. However, if necessary, the movement amount of the movable platen 2 may be directly used.

What is claimed is:

1. A mold closure position detection method for a mold clamping apparatus in which a mold closure position is detected on the basis of a variation in a physical quantity because of closure of a mold, the method comprising:

detecting an amount of movement of a movable platen, or a crosshead in the case where the mold clamping apparatus is of a toggle type, during closure of the mold;

detecting a variation in the physical quantity because of closure of the mold;

obtaining a rate of variation in the physical quantity to a predetermined amount of movement of the movable platen or the crosshead; and detecting, as a mold closure position, a position of the movable platen or the crosshead when the variation rate reaches a preset ratio.

2. A mold closure position detection method for a mold clamping apparatus according to claim 1, wherein the moving amount of the movable platen or the crosshead is detected by use of encoder pulses output from a rotary encoder for detecting rotation of a mold clamping servomotor.

3. A mold closure position detection method for a mold clamping apparatus according to claim 1, wherein the physical quantity is load torque at the time of closure of the mold.

4. A mold closure position detection method for a mold clamping apparatus according to claim 3, wherein variation in the load torque is graphically displayed in a graphic display section having a horizontal axis for position of the crosshead.

5. A mold closure position detection method for a mold clamping apparatus according to claim 4, wherein, in the graphic display section, a cursor indicating the detection value of the mold closure position and a cursor indicating the reference value of the mold closure position are displayed in the from of vertical lines of different colors.

6. A mold closure position detection method for a mold clamping apparatus according to claim 1, wherein a position of the crosshead is displayed as the detection value of the mold closure position by use of a numerical value display section, and a position of the movable platen converted from the position of the crosshead is displayed by use of the numerical value display section.

7. A mold closure position detection method for a mold clamping apparatus according to claim 1, wherein a position of the crosshead is displayed as the reference value of the mold closure position by use of a numerical value display section, and a position of the movable platen converted from the position of the crosshead is displayed by use of the numerical value display section.

8. A mold closure position detection method for a mold clamping apparatus according to claim 1, wherein a mold protection zone is set when the mold is closed, and detection of the mold closure position is performed after passage of the mold protection zone.

* * * * *